(12) United States Patent
Pauloz et al.

(10) Patent No.: US 11,718,000 B2
(45) Date of Patent: Aug. 8, 2023

(54) METHOD FOR MANUFACTURING A REDUCER WHEEL BY OVERMOLDING

(71) Applicant: JTEKT EUROPE, Irigny (FR)

(72) Inventors: Olivier Pauloz, Chaponost (FR); Gaël Grampre, Oullins (FR); Damien Jacquet, Lyons (FR)

(73) Assignee: JTEKT EUROPE, Irigny (FR)

( * ) Notice: Subject to any disclaimer, the term of this patent is extended or adjusted under 35 U.S.C. 154(b) by 403 days.

(21) Appl. No.: 17/007,746

(22) Filed: Aug. 31, 2020

(65) Prior Publication Data
US 2021/0060835 A1 Mar. 4, 2021

(30) Foreign Application Priority Data

Aug. 29, 2019 (FR) ...................................... 19/09509

(51) Int. Cl.
*B29C 45/14* (2006.01)
*B29L 15/00* (2006.01)
*B29L 31/32* (2006.01)

(52) U.S. Cl.
CPC ....... *B29C 45/1459* (2013.01); *B29L 2015/00* (2013.01); *B29L 2031/32* (2013.01)

(58) Field of Classification Search
CPC .................................................. B29C 45/1459
See application file for complete search history.

(56) References Cited

U.S. PATENT DOCUMENTS

| 4,535,827 A | * | 8/1985 | Seaford | B29C 45/14491 |
| | | | | 301/64.707 |
| 2013/0228028 A1 | * | 9/2013 | Kim | B29C 45/1671 |
| | | | | 264/279 |
| 2017/0120487 A1 | | 5/2017 | Brochot et al. | |

FOREIGN PATENT DOCUMENTS

| CN | 107620782 | * | 1/2018 |
| DE | 102012102780 | * | 10/2013 |
| EP | 2952321 A1 | | 12/2015 |
| WO | WO2015162388 | * | 10/2015 |

* cited by examiner

*Primary Examiner* — Edmund H Lee
(74) *Attorney, Agent, or Firm* — Oliff PLC

(57) ABSTRACT

A method for manufacturing a wheel integrated to a support shaft, including: making by overmolding, in a first material, of a wheelrim on the support shaft, the wheelrim having an upper face having a ribbed annular portion in which cells are formed, delimited by reinforcing ribs and having respective bottoms, making by overmolding, in a second material, of a crown on the upper face of the wheelrim, by implementing an injection in at least one injection point positioned opposite the ribbed annular portion, prior to the step of making the crown by overmolding, formation of a material deposit in at least one target cell, selected amongst the cells, so as to form a raised area with respect to bottom thereof, the injection of the second material at the injection point being performed opposite the raised area.

11 Claims, 4 Drawing Sheets

METHOD FOR MANUFACTURING A REDUCER WHEEL BY OVERMOLDING

The present invention concerns a method for manufacturing, by overmolding, a reducer wheel integrated to a support shaft.

It also relates to such a reducer wheel made by implementing such a method.

In the field of power steering systems for motor vehicles, it is known to use gear reducers allowing transmitting to the wheels of such a motor vehicle a torque supplied by an assist motor, in order to facilitate driving of the vehicle.

Such a gear reducer commonly includes a toothed wheel, also called worm wheel, meshing with a worm screw driven by an assist motor, this toothed wheel being moreover secured to a support shaft, also called output shaft, which may be coupled to a steering column and whose rotational movement is transmitted to the wheels of the vehicle via a steering rack.

It is already known to manufacture such a toothed wheel of a gear reducer by implementing a method for overmolding a wheelrim and a crown directly on the output shaft.

For example, the document EP2952321 describes an overmolding method consisting in overmolding a corolla-like shaped wheelrim on the output shaft, and then wrapping this wheelrim with a thermoplastic material, forming a crown at the periphery of which teeth are cut afterwards intended to mesh with a worm screw of a gear reducer.

This method requires injecting the thermoplastic material forming the crown at the level of several injection points disposed opposite an upper face of the wheelrim, in the immediate proximity of the latter.

Yet, this thermoplastic material being injected at high temperature, there is a risk of melting and deterioration of the portions of the wheelrim positioned opposite the injection points: it is then possible that the material thus molten of the wheelrim is mixed with the material used for overmolding the crown, leading to a heterogeneity of the crown which might alter the mechanical strength of the latter.

In the document EP2952321, the risk of melting of the wheelrim is limited because of the arrangement, opposite each injection point, of cold-drop traps in the form of cavities adapted to contain a cold drop formed, during the prior step of making the wheelrim, in the injection system used to inject the materials constituting the wheelrim and the crown.

Thus, the presence of these cold-drop traps effectively increases the distance between the injection points and the wheelrim, allowing limiting the local heat-up of the latter.

Yet, the integration of these cold-drop traps to the wheelrim may turn out to be binding (because it imposes imparting a particular and complex shape to the wheelrim, which might possibly weaken it) and it may also turn out to be more effective to arrange one or several cold-drop trap(s) common to all of the injection points, upstream of the latter in the injection system: when the wheelrim does not include any cold-drop traps disposed opposite the injection points, it is then necessary to limit, by another means, the risk of partial melting of the latter in the proximity of the injection points.

An object of the present invention is to solve all or part of this drawback, by providing a method for manufacturing a reducer wheel implementing an overmolding of a wheelrim and of a crown directly on the output shaft and allowing limiting the local heat-up of the wheelrim without having to arrange complex-shaped specific structures into the latter during the formation thereof.

Another object of the invention is to provide a method allowing manufacturing reducer wheels with various shapes and sizes.

Still another object of the invention is to provide a method that could be simply implemented using common and already existing overmolding plants and tooling.

To this end, it provides a method for manufacturing a reducer wheel integrated to a support shaft, said manufacturing method including the following steps:

making by overmolding, in a first material, of a wheelrim on the support shaft, said wheelrim extending radially from an inner peripheral edge disposed around the support shaft up to an outer peripheral edge and having an upper face and a lower face opposite to one another, said upper face having a ribbed annular portion in which cells are formed, delimited by reinforcing ribs and having respective bottoms, making by overmolding, in a second material, of a crown on the upper face of the wheelrim, by implementing an injection of said second material in at least one injection point positioned opposite the ribbed annular portion, said method being characterized in that it includes, prior to the step of making by overmolding the crown on the wheelrim, a step of forming a material deposit in at least one target cell, selected amongst the cells of the ribbed annular portion, so as to form a raised area with respect to the bottom of said target cell, and in that the injection of the second material at the injection point is performed opposite said raised area.

Thus, the invention suggests reducing the risk of a local heat-up of the wheelrim leading to a partial melting of the latter during the making of the crown by overmolding, by arranging a specific shape on the upper face of the wheelrim, in the form of a deposition of a material.

More particularly, the material deposit, made before the step of making the crown by overmolding, leads to the formation of a raised area at the bottom of a target cell, the latter being positioned opposite the injection point in which the second material, of which the crown is made, is injected.

Indeed, the presence of this raised area in the target cell allows limiting the local heat-up of the wheelrim, in particular in two ways.

First, the material deposit made at the bottom of the target cell has the effect of locally increasing the mass of the wheelrim in the proximity of the injection point: therefore, the heat capacity of the wheelrim is also increased. Thus, the wheelrim is capable of absorbing a larger amount of heat (transmitted to the latter by the second material injected at high temperature in the proximity of the injection point) than in the absence of the raised area, without reaching its melting point.

Second, the material deposit allows making the size of the contact surface between the wheelrim and the second material decrease during the injection thereof, and thus reducing the amount of heat transmitted, through this contact surface, to the wheelrim by the second material. Thus, the heat exchanges between the wheelrim and the second material are also reduced and the risk of partial melting of the wheelrim is limited.

It should be noted that the shape and the depth of the cells, delimited by the reinforcing ribs, are left open and may in particular be advantageously selected in order to guarantee a proper fastening and a proper adherence of the crown on the wheelrim after cooling of the second material.

In one embodiment, the material deposit is made in the first material.

According to one possibility, the formation of the material deposit is performed concomitantly with the making of the wheelrim by overmolding.

In this manner, the step of forming the material deposit amounts to incorporating directly the material deposit to the wheelrim during the making of the latter by overmolding on the support shaft: this material deposit being made in the same constituent material of the upper face of the wheelrim and of the reinforcing ribs, that being therefore equivalent to a modification of the shape of the target cell.

For example, this shape modification may be carried out by modifying the shape of the mold used to perform the overmolding of the wheelrim on the support shaft.

Hence, it is obvious that, within the meaning of the invention, the shape modification of the target cell is conceptually considered herein as an addition, in the target cell, of a shape (namely the raised area or the material deposit) specific to the wheelrim, although such a material deposit could be directly integrated to the wheelrim during the manufacture thereof.

Moreover, it is possible to consider the material deposit not being made in the first material and the step of forming this material deposit being subsequent to the step of making the wheelrim by overmolding, but prior to the step of making the crown by overmolding. In this case, the raised area appears as a shape distinct from the wheelrim and external to the latter, disposed over the upper face of the latter inside the target cell.

According to one feature, the material deposit is made in a heat-insulating material, having a thermal diffusivity lower than that of the first material.

Thus, the material deposit formed in the target cell can absorb a large proportion of the heat released by the second material during the injection thereof at the injection point: the risk of partial melting of the wheelrim is then reduced even further.

In one variant, the raised area links at least two reinforcing ribs delimiting the target cell.

According to one possibility, the raised area has an upper surface flush with the upper face of the wheelrim.

The target cell then appears as filled over the entire depth thereof at the level of the raised area, the material deposit filling the latter up to the level of an upper surface of the reinforcing ribs delimiting it, this upper surface constituting a portion of the upper face of the wheelrim.

When the material deposit is made in the first material, the latter is then indistinguishable from the reinforcing ribs delimiting the target cell.

According to one feature, the material deposit does not project from the upper face of the wheelrim.

In one embodiment, each cell extends over a determined radial length from the outer peripheral edge of the wheelrim according to a radial direction, and wherein an inner distance measured in the at least one target cell according to the corresponding radial direction between said outer peripheral edge of the wheelrim and the raised area of said target cell is smaller than the radial length of each of the cells other than the at least one target cell.

Thus, the cells may have an oblong shape extending according to a radial direction from the outer peripheral edge of the wheelrim and having one end pointing towards the inner peripheral edge of the wheelrim: the material deposit is then made at such one end of one of them, corresponding to the target cell.

Thus, this target cell appears, in front view of the upper face of the wheelrim, as the «shortest» cell (that is to say having the smallest radial length among all cells).

Such a positioning of the material deposit allows guaranteeing the latter not being made neither too close to the inner peripheral edge of the wheelrim nor too close to the outer peripheral edge of the wheelrim, these two radial positions having several difficulties during the step of overmolding the crown on the wheelrim (heterogeneous distribution of the injected second material, risk of deterioration of the thin wheelrim in the proximity of its outer peripheral edge, etc.).

According to one feature, the material deposit is not in contact with the outer peripheral edge of the wheelrim.

According to another feature, the material deposit is not in contact with the inner peripheral edge of the wheelrim.

In one variant, the material deposit is made straight above a boss formed on the upper face of the wheelrim, in the ribbed annular portion.

For example, such a boss may have the shape of a cambered or projecting area, made in the first material, disposed over the upper face of the wheelrim, between two reinforcing ribs and in the proximity of the inner peripheral edge of the wheelrim.

As before, such a boss allows locally increasing the heat capacity of the wheelrim: by making the material deposit in the immediate proximity of such a boss (that is to say by selecting the target cell amongst the adjacent cells of this boss), it is thus possible to limit even further the risk of local heat-up of the wheelrim.

Indeed, the injection point being located close to the boss, the latter absorbs a portion of the heat released by the injection of the second material in the neighboring target cell.

According to one possibility, the boss extends radially from the raised area in the direction of the inner peripheral edge.

In one embodiment, the step of making the crown by overmolding implements the injection of the second material in at least two distinct injection points, each of said injection points being positioned opposite the ribbed annular portion, and the step of forming a material deposit in at least one target cell comprises the formation of a material deposit in at least two distinct target cells so as to form two raised areas with respect to the bottom of the respective target cells, and the injection of the second material is performed opposite said respective raised areas.

In other words, it is possible to consider the injection of the second material being made in several injection points, each of these injection points being disposed opposite a corresponding raised area formed by a material deposit in one of the cells of the wheelrim Hence, this embodiment of the invention includes several target cells similar to the previously described one, the material deposit formed in each of them having the same features and filling the same function: thanks to the raised areas placed on the bottom of the different target portions, it is possible to prevent the partial melting of the wheelrim in the proximity of each of the injection points.

According to one possibility, the step of making the crown by overmolding implements the injection of the second material in three distinct injection points, and wherein the step of forming a material deposit in at least one target cell comprises the formation of a material deposit in three distinct target cells.

According to one feature, the wheelrim includes as many raised areas as injection points, each of these raised areas being disposed in a target cell positioned opposite an injection point.

In one variant, the second material is injected using an injection system including at least one cold-drop trap, said at least one cold-drop trap being designed so as to prevent, during the step of making the crown over the wheelrim, the injection in each injection point of a cold drop solidified beforehand in the injection system, during a prior injection of the second material by said injection system.

For example, it is possible to consider the injection system including a main conduit in which the second material to be injected circulates, this main conduit being split into several secondary conduits each feeding one injection nozzle positioned in each of the injection points.

It is possible to arrange, at one end of the main conduit, upstream of the injection nozzles, a cold-drop trap allowing avoiding a cold drop of the second material, formed in the main conduit during a prior step of making a crown over a wheelrim of another reducer wheel, being injected by the injection nozzles during the step of making the crown: if such a cold drop is injected by any of the injection nozzles in an injection point, the latter would be integrated to the crown after cooling of the second material.

The presence of such a cold drop would represent a defect in the inner structure of a wheel manufactured by the method according to the invention and could, on the long run, alter the mechanical performances of the latter.

In another embodiment, the first material and the second material are injected using the same injection system including at least one cold-drop trap, said at least one cold-drop trap being designed so as to prevent, during the step of making the crown over the wheelrim, the injection in each injection point of a cold drop solidified beforehand in the injection system, during the step of making the wheelrim over the support shaft.

In this embodiment, the cold drop formed in the injection system is constituted by the first material: if this cold drop finds its way in the crown of a wheel manufactured by the method according to the invention, it would render the structure of the latter even more heterogeneous and would degrade even more the mechanical characteristics of the latter.

The invention also concerns a reducer wheel integrated to a support shaft the manufacture thereof implements the manufacturing method as previously described, and including:

a wheelrim made by overmolding, in a first material, on the support shaft, said wheelrim extending radially from an inner peripheral edge disposed around the support shaft up to an outer peripheral edge and having an upper face and a lower face opposite to one another, said upper face having a ribbed annular portion in which cells are formed, delimited by reinforcing ribs and having respective bottoms,
  a crown made by overmolding, in a second material, on the upper face of the wheelrim,
  said wheelrim having a material deposit in at least one target cell, selected amongst the cells of the ribbed annular portion, said material deposit forming a raised area with respect to the bottom of said target cell.

Other features and advantages of the present invention will appear on reading the detailed description hereinafter, of a non-limiting example of implementation, made with reference to the appended figures in which.

Figure 1:
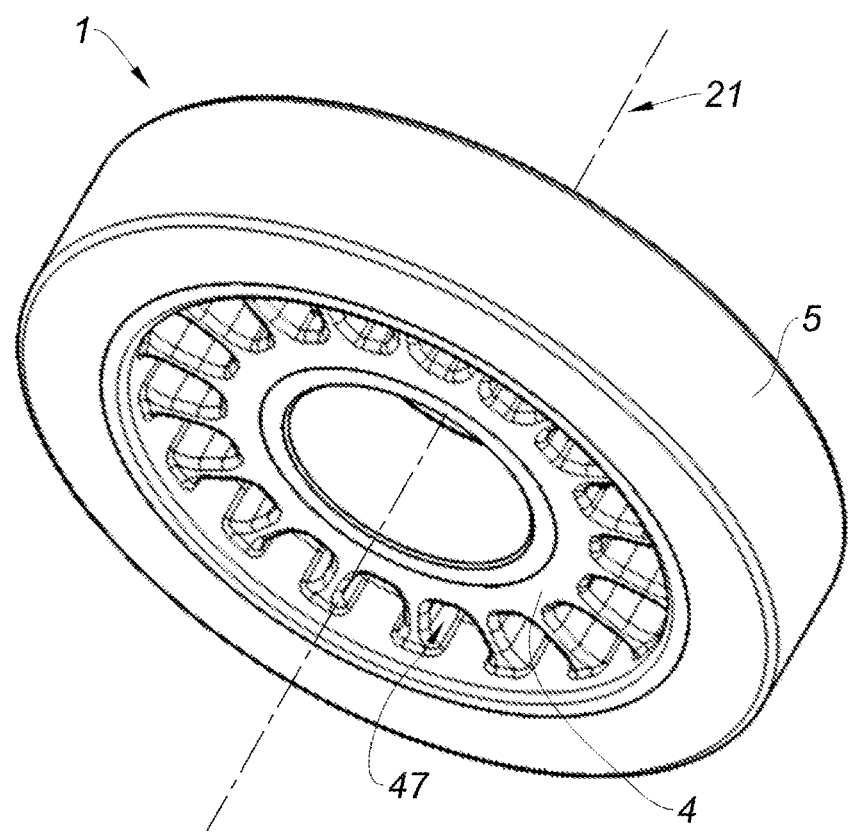
FIG. 1 is a perspective view of a wheel according to the invention.
Figure 2:
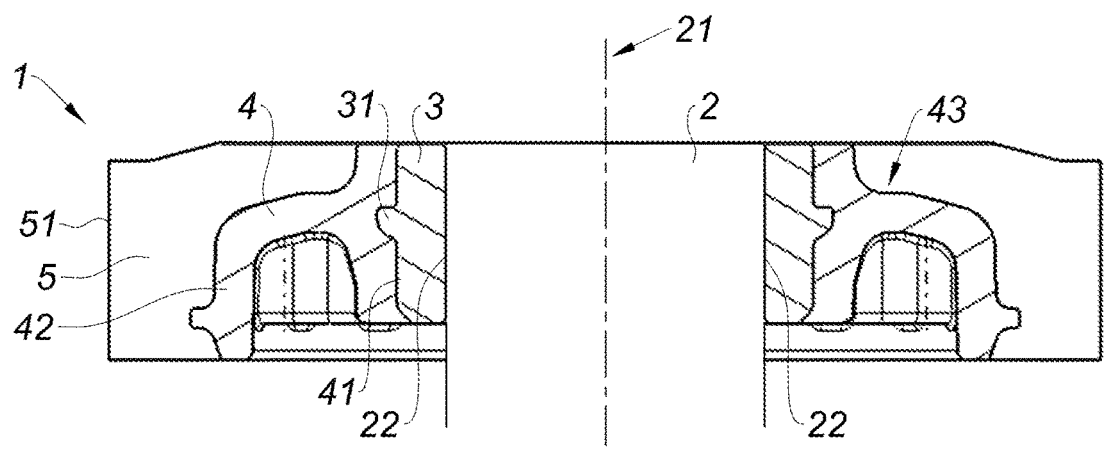
FIG. 2 is a cross-sectional view of a wheel according to the invention.

FIGS. 1 and 2 represent (respectively, in perspective and in cross-section) a wheel 1 of a reducer of a power steering system of a motor vehicle, made using a method for manufacturing by overmolding according to the invention. As shown in FIG. 2, this wheel 1 is integrated to a support shaft 2 (not represented in FIG. 1) having a longitudinal axis 21 and an outer wall 22.

In the embodiment represented in FIG. 2, the support shaft is provided with a metallic ring 3, in contact with the outer wall 22 and having a radial projection 31.

The method according to the invention consists in injecting, over this ring 3, a first material so as to form a wheelrim 4, extending radially between an inner peripheral edge 41, in contact with the metallic ring 3, and an outer peripheral edge 42 and generally having an inverted corolla-like shape.

In particular, the wheelrim 4 includes an upper face 43, whose structure will be described more specifically later on.

The projection 31 allows ensuring a proper adherence between the metallic ring 3 and the wheelrim 4 and securing the wheel 1 to the support shaft 2.

In other embodiments, the wheelrim 4 is directly in contact with the outer wall 22 of the support shaft 2, this support shaft including no metallic ring 3.

Afterwards, this wheelrim 4 is wrapped with a second material so as to form a crown 5, in contact with the upper face 43 of the wheelrim 4, this crown 5 having an outer peripheral edge 51 in which teeth intended for example to cooperate with a worm screw could be carved.

Hence, the method according to the invention includes at least two successive steps:

making by overmolding, in the first material, of the wheelrim 4 on the support shaft 2, then
  making by overmolding, in the second material, of the crown 5 on the upper face 43 of the wheelrim 4.

Figure 3:
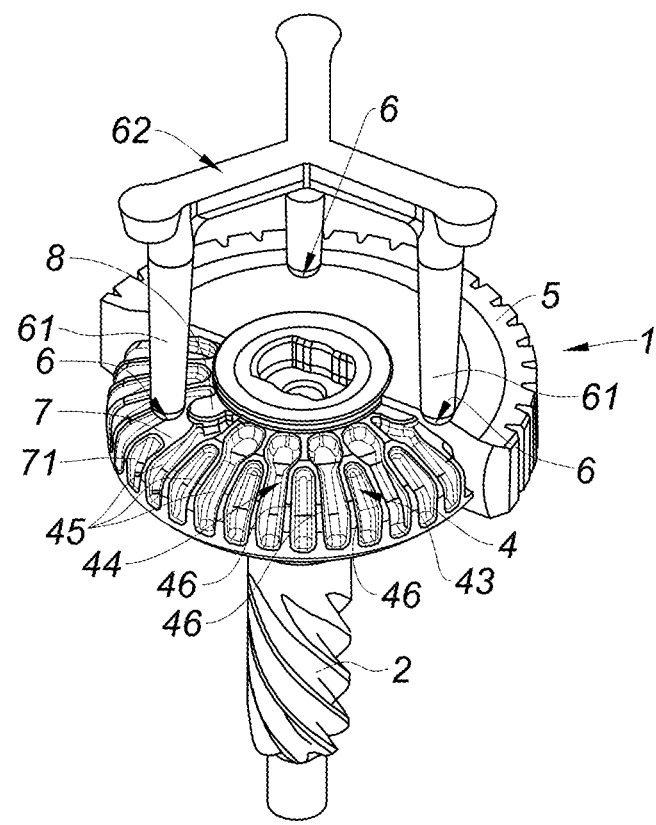
FIG. 3 is a perspective view of the step of making the crown by overmolding on the wheelrim.

FIG. 3 illustrates the step of making the crown 5 on the wheelrim 4.

This overmolding step is carried out by injection of the second material in several injection points 6, thanks to three injection nozzles 61 fed by an injection system 62.

These injection points 6 are disposed opposite the upper face 43 of the wheelrim 4, and more particularly opposite a ribbed annular portion 44 of this same upper face 43, this ribbed annular portion 44 having cells 45 delimited by reinforcing ribs 46.

These reinforcing ribs 46 extend radially from the outer peripheral edge 42 of the wheelrim 4 towards the inner peripheral edge 41 of the latter, thereby forming therebetween oblong-shaped cells 45 also extending radially from the outer peripheral edge 42.

This cellular structure of the wheelrim 4, intended to be covered by the crown 5, allows creating a very wide contact surface between the wheelrim 4 and the crown 5 and thus guaranteeing a strong adherence between these two elements, thereby conferring a good robustness on the wheel 1.

A detail view of the upper face 43 of the wheelrim 4 is proposed in the following FIGS. 4 and 5.

In particular, it is possible to distinguish therein the presence of a raised area 7 in a target cell 71 located in facing arrangement with an injection point 6, this raised area 7 being formed by a material deposit on a bottom 72 of this target cell 71.

For example, this material deposit may be made in the first material.

This target cell 71 is selected amongst the cells 45 and is located in a facing arrangement with an injection point 6.

As previously described, the presence of this raised area 7 in a facing arrangement with the injection point 6 allows avoiding a local heat-up of the wheelrim 4 that might lead to a partial melting of the latter.

Indeed, this raised area 7 allows locally increasing the mass of the wheelrim and, therefore, the heat capacity of the latter: the wheelrim 4 could therefore absorb a larger amount of heat in the proximity of the injection point 6 without undergoing a considerable rise of temperature.

In addition, the presence of the raised area 7 allows reducing the contact surface between the wheelrim 4 and the second material injected at the injection point 6, and therefore reducing the magnitude of the heat exchanges occurring between this wheelrim 4 and this second material during the making of the crown 5.

Figure 4:
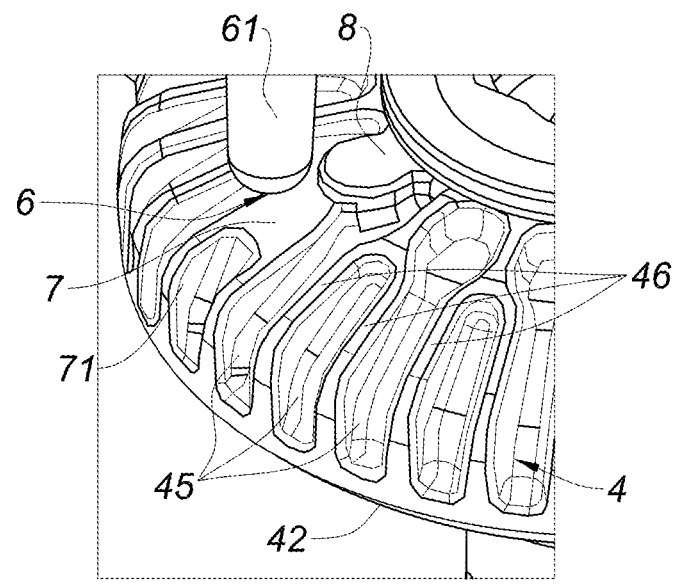
FIG. 4 is a detail view of the previous FIG. 3.
Figure 5:
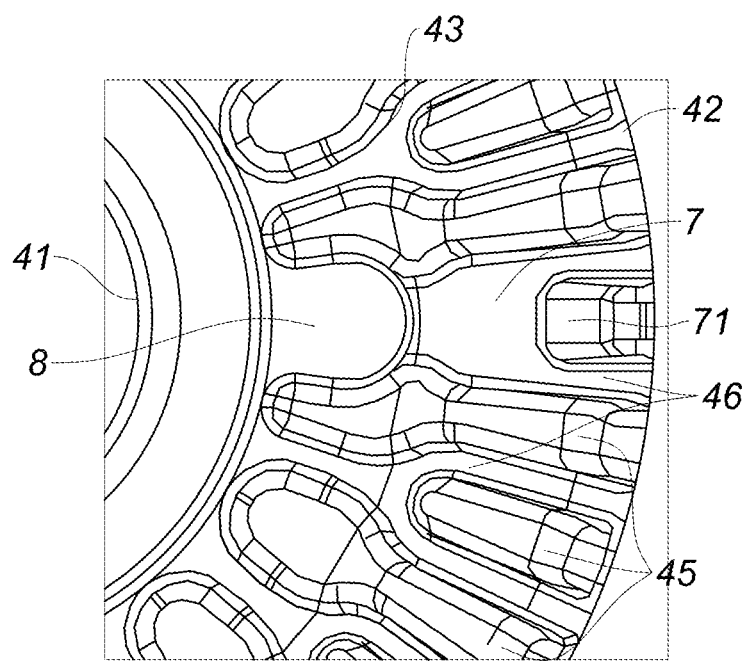
FIG. 5 is a top view of a portion of the upper face of the wheelrim.

In the embodiment represented in FIGS. 3 to 5, the raised area 7 is flush with the upper face 43 of the wheelrim 4, so that the target cell 71 appears filled over the entire depth thereof and the raised area 7 could be distinguished from the reinforcing ribs 46 delimiting this target cell 71.

It should be noted that the invention considers several different embodiments of the raised area 7:
- the formation of the material deposit constituting the raised area 7 may be carried out after the step of making the wheelrim 4, for example by matter injection in the target cell 71 once the latter is formed, or
- the formation of the material deposit constituting the raised area 7 may be carried out concomitantly with the step of making the wheelrim 4, for example by modifying the shape of a mold used to carry out the overmolding of this wheelrim 4 on the support shaft 2, without any additional injection step.

It is also possible to consider the raised area being made in the first material (this raised area 7 is then homogeneous with the wheelrim 4) or in a different material, in particular a material having heat-insulating characteristics (the raised area 7 then appears as a heterogeneous element external to the wheelrim 4).

In the embodiment of the invention described in FIG. 3, the wheelrim 4 has a raised area 7 opposite each of the three injection points 6, although only one of them is shown: each of these raised areas 7 allows avoiding a local heat-up of the wheelrim 4 opposite each of the injection points 6.

In addition, the raised area 7 is disposed in the proximity of a boss 8 extending radially between the injection point 6 and the inner peripheral edge 42 of the wheelrim 4. This boss 8, appearing as a portion slightly projecting from the upper face 43, allows increasing even more the mass and the heat capacity of the wheelrim 4 locally in the proximity of the injection point 6: by disposing the material deposit forming the raised area 7 in a cell 45 next to this boss 8 (that is to say by selecting the target cell 71 amongst the cells 45 in contact with this boss 8), it is thus possible to limit even more the risk of heat-up of the wheelrim 4.

Figure 6:
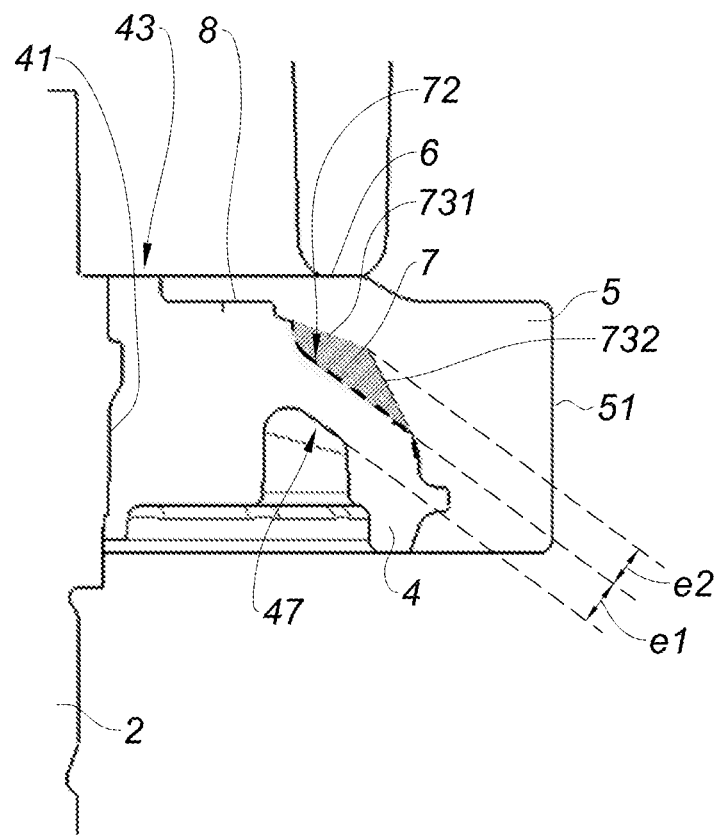
FIG. 6 is a cross-sectional view of a target cell.

FIG. 6 is a cross-sectional view of the target cell 71.

The material deposit forming the raised area 7 is disposed opposite the injection point 6, in a position where the thickness e1 of the wheelrim 4 (defined as the distance separating the upper face 43 from an opposite lower face 47 of the wheelrim 4) is minimum.

The raised area has, opposite the injection point 6, a thickness e2 with a similar size: the presence of the raised area in the target cell 71 therefore allows effectively doubling the thickness of the wheelrim 4 opposite the injection point 6. In this manner, the wheelrim 4 has a better robustness and is better protected from the risk of a partial melting, which may lead to a breakage, opposite the injection point 6.

Moreover, it should be noted that the raised area 7 includes an upper surface 73 having a first slope 731 and a second slope 732 with a different inclination with respect to the bottom 72 of the target cell 71, this first slope 731 and this second slope 732 being selected so as to promote the flow of the second material injected at the injection point 6 and better distribute the latter over the upper face 43 of the wheelrim 4.

Figure 7:
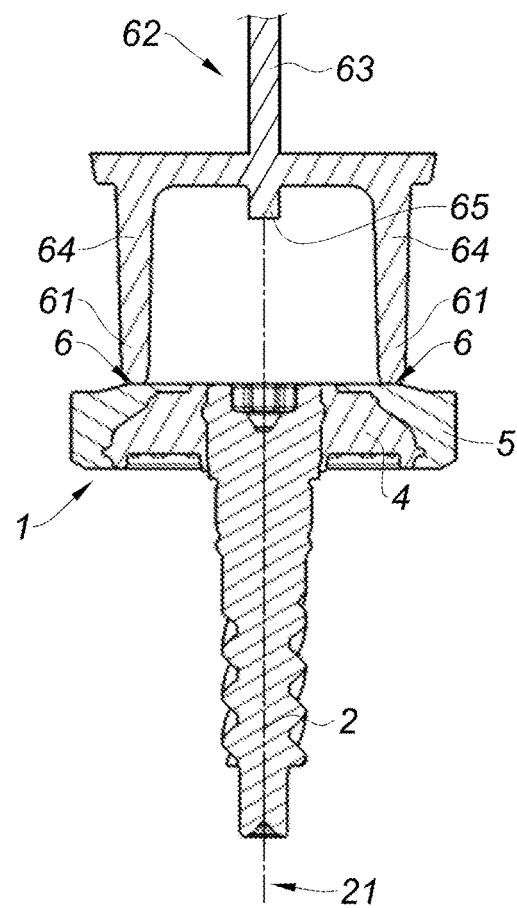
FIG. 7 is a cross-sectional view of the step of making the crown by overmolding on the wheelrim.

FIG. 7 is a cross-sectional view of the wheel 1 and of the injection system 62.

As shown in this FIG. 7, the injection system 62 includes a main conduit 63 connected to each of the nozzles 61 by a secondary conduit 64: the second material, introduced into the main conduit 63, and thus directed towards each nozzle 61 and injected in each injection point 6 through the secondary conduits 64.

The injection system 62 also includes a cold-drop trap 65, herein in the form of a cavity positioned in the continuation of the main conduit, upstream of the secondary conduits 64.

This injection system being adapted to be used for the successive making of several reducer wheels by implementing the method according to the invention, it is possible that, on completion of the step of making by overmolding a crown of another reducer wheel, a cold drop, created by cooling of an amount of the second material, is formed in the main conduit 63.

During the injection of the second material during the step of making the crown 5 by overmolding on the wheelrim 4, this cold drop is expelled in the continuation of the main conduit (according to the longitudinal axis 21, in the direction of the wheel 1) and is introduced into the cold-drop trap 65, in which it remains kept for the entire duration of the injection of the second material.

Thus, this cold drop is not injected, by any of the nozzles 61, in an injection point 6 and remains located in the injection system 62: the latter therefore remains integrated to the «sprue», which will be detached from the wheel 1 on completion of the step of making the crown 5 by overmolding. Thanks to the presence of the cold-drop trap 65, common to all of the injection nozzles 61 and located upstream of the latter, it is possible to avoid the incorporation of a cold drop in the wheel 1 during the step of making the crown 5 by overmolding: thus, it is not necessary to arrange cold-drop traps in the wheelrim 4, in the proximity of each of the injection points 6.

In particular, it is not necessary to arrange trapping cavities in the wheelrim 4 specific to each injection point 6, as is recommended by the document EP2952321.

It is also possible to consider the same injection system 62 being successively used to inject the first material and then the second material during the method according to the invention: in this case, the cold-drop trap 65 may be used to prevent the injection of a cold drop made in the first material and formed during the step of making the wheelrim 4 by overmolding.

Figure 8:
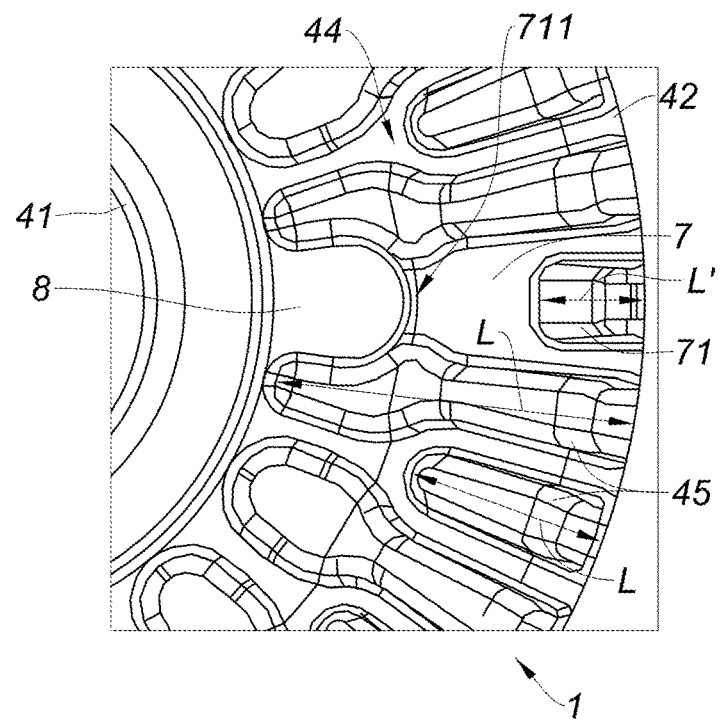
FIG. 8 is a top view of a portion of the upper face of the wheelrim.

FIG. 8, representing a portion of the upper face 43 in top view, allows illustrating the radial positioning of the raised area 7.

Indeed, it is advantageous to dispose this raised area 7 so that the latter is neither too close to the inner peripheral edge 41, nor too close to the outer peripheral edge 42, in order to promote the proper propagation of the second material injected at the injection point 6 disposed opposite the raised area 7 and avoid the deterioration of the most fragile portions of the wheelrim 4.

In the embodiment represented in FIG. 8, the raised area 7 is thus disposed approximately at the middle of a radial width of the ribbed annular portion 44, slightly closer to the outer peripheral edge 42 than to the inner peripheral edge 41. More specifically, the raised area 7 is disposed at one end 711 of the target cell 71 in contact with the boss 8.

Each of the cells 45 has an oblong shape, extending radially from the outer peripheral edge 42 of the wheelrim 4 over a radial length L, measured according to a radial direction between the outer peripheral edge 42 and a reinforcing rib 46 delimiting each of the cells 45.

Because of the positioning of the raised area in the target cell 71, the latter extends radially only over an inner distance L', measured in the target cell 71 according to the radial direction between the outer peripheral edge 42 of the wheelrim 4 and the raised area 7: this inner distance L' being smaller than the radial length L of each of the other cells 45, the target cell 71 therefore actually appears as the «shortest» cell (that is to say, having the smallest radial extension) of the upper face 43 of the wheelrim 4.

Thus, such a radial positioning of the raised area 7 in the target cell 71 allows carrying out the step of injecting the second material effectively so as to form the crown 5 by overmolding on the wheelrim 4, while limiting the risk of local heat-up of this wheelrim 4 in the proximity of the injection point 6.

The invention claimed is:

1. A method for manufacturing a reducer wheel integrated to a support shaft, the manufacturing method including:
   making by overmolding, in a first material, a wheelrim on the support shaft, the wheelrim extending radially from an inner peripheral edge disposed around the support shaft up to an outer peripheral edge and having an upper face and a lower face opposite to one another, the upper face having a ribbed annular portion in which cells are formed, delimited by reinforcing ribs and having respective bottoms,
   forming a material deposit in at least one target cell, selected amongst the cells of the ribbed annular portion, so as to form a raised area with respect to the bottom of the target cell, and then
   making by overmolding, of a second material, a crown on the upper face of the wheelrim, by injecting the second material in at least one injection point positioned opposite the ribbed annular portion and opposite the raised area.

2. The manufacturing method according to claim 1, wherein the material deposit is made of the first material.

3. The manufacturing method according to claim 1, wherein the formation of the material deposit is performed concomitantly with the making of the wheelrim by overmolding.

4. The manufacturing method according to claim 1, wherein the raised area links at least two reinforcing ribs delimiting the target cell.

5. The manufacturing method according to claim 1, wherein the raised area has an upper surface flush with the upper face of the wheelrim.

6. The manufacturing method according to claim 1, wherein each cell extends over a determined radial length from the outer peripheral edge of the wheelrim according to a radial direction, and wherein an inner distance measured in the at least one target cell according to the corresponding radial direction between the outer peripheral edge of the wheelrim and the raised area of the target cell is smaller than the radial length of each of the cells other than the at least one target cell.

7. The manufacturing method according to claim 1, wherein the material deposit is made straight above a boss formed on the upper face of the wheelrim, in the ribbed annular portion.

8. The manufacturing method according to claim 7, wherein the boss extends radially from the raised area in the direction of the inner peripheral edge.

9. The manufacturing method according to claim 1, wherein:
   the making of the crown by overmolding is performed by injecting the second material in at least two distinct injection points, each of the injection points being positioned opposite the ribbed annular portion,
   the forming of a material deposit in at least one target cell comprises forming a material deposit in at least two distinct target cells so as to form two raised areas with respect to the bottom of the respective target cells, and
   the second material is injected opposite the respective raised areas.

10. The manufacturing method according to claim 9, wherein:
    the at least two injection points comprise three distinct injection points, and
    the at least two distinct target cells comprises three distinct target cells.

11. The manufacturing method according to claim 1, wherein the second material is injected using an injection system including at least one cold-drop trap, the at least one cold-drop trap being designed so as to prevent, during the making of the crown over the wheelrim, the injection in each injection point of a cold drop solidified beforehand in the injection system, during a prior injection of the second material by the injection system.

* * * * *